3,152,244
PIVOTED HEATER ASSEMBLY

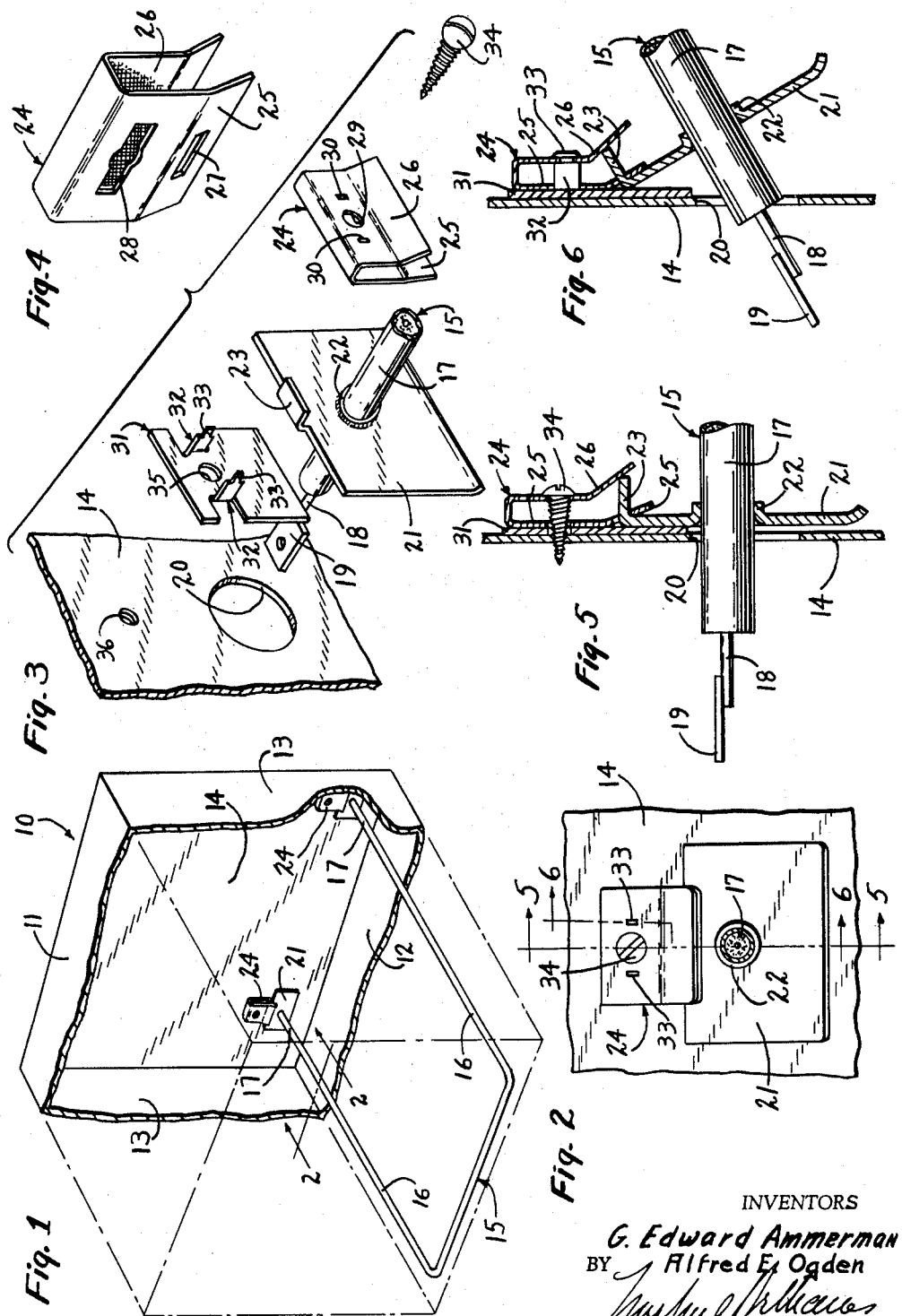

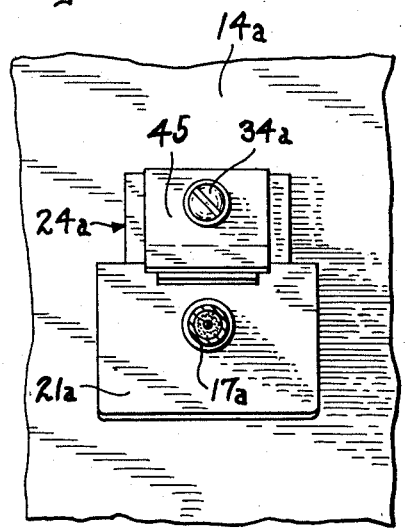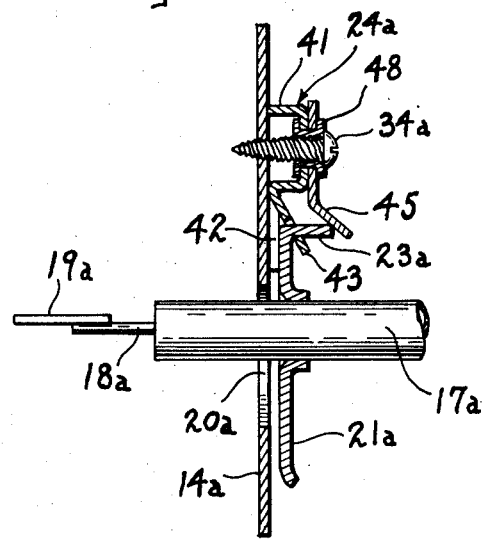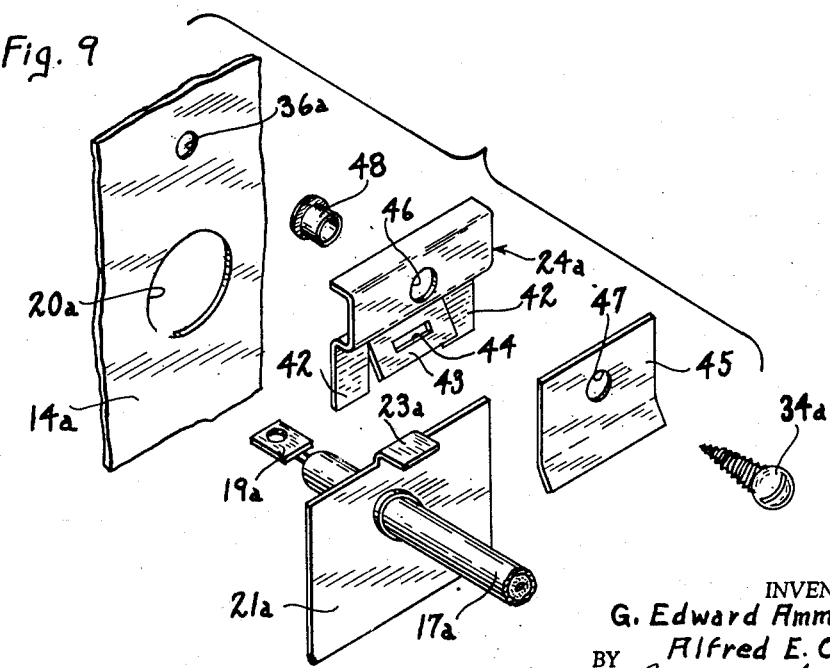

George Edward Ammerman, Oakmont, Pa., and Alfred E. Ogden, Murfreesboro, Tenn., assignors to Edwin L. Wiegand Company, Pittsburgh, Pa.
Filed July 5, 1960, Ser. No. 40,883
9 Claims. (Cl. 219—409)

The present invention relates to electric heating apparatus, more particularly to apparatus adapted for use in ovens use for baking purposes, and the principal object of the invention is to provide new and improved apparatus of such character.

The present invention is an improvement on the apparatus disclosed in Letters Patent No. 2,824,944, and in addition to the advantages therein pointed out, the instant structure may readily be applied to practically any range construction, the maximum modification normally required being the drilling of two small holes in the interior wall of the oven. Other advantages possessed by the present invention is that a positive ground for the heating element is provided together with means for releasably holding the element in a non-heating position to facilitate cleaning of the oven interior. Other advantages will readily become apparent from a study of the following description and from the appended drawing.

In the drawings accompanying this specification and forming a part of this application there is shown, for purpose of illustration, embodiments which the invention may assume, and in these drawings:

FIGURE 1 is a fragmentary perspective view of an enclosure, such as formed by the oven of a domestic range, showing a preferred embodiment of the invention, FIGURE 2 is an enlarged, fragmentary sectional view generally corresponding to the line 2—2 of FIGURE 1, FIGURE 3 is an exploded perspective view of the parts seen in FIGURE 2, FIGURE 4 is a perspective view of the rear side of one of the parts seen in FIGURE 3, FIGURE 5 is an enlarged, fragmentary sectional view generally corresponding to the line 5—5 of FIGURE 2, FIGURE 6 is a view similar to FIGURE 5 but generally corresponding to the line 6—6 of FIGURE 2 and with certain parts disposed in another position from that shown in FIGURE 5, FIGURE 7 is a view similar to FIGURE 2 but of another embodiment of the invention, FIGURE 8 is an enlarged, fragmentary sectional view generally corresponding to the line 8—8 of FIGURE 7, and FIGURE 9 is an exploded perspective view of the parts seen in FIGURES 7 and 8.

With reference to FIGURE 1, there is represented an oven 10 of a conventional domestic range having top and bottom walls 11 and 12 respectively, side wall 13—13, and rear wall 14. Although not shown, the open front of the oven will be closed by the usual door.

Disposed within the oven for heating the interior thereof in an electric heating element 15 of the well-known, elongated, tubular sheath type having an intermediate heat-generating portion 16 and terminal end portions 17 for conducting electrical energy to the portion 16. Each element terminal end portion 17 has a terminal pin 18 protruding therefrom (see FIGURE 3) which carries a terminal lug for a purpose to appear.

In the present embodiment, the heat-generating portion 16 of the element is formed to a U-shaped configuration having leg portions disposed adjacent respective oven side walls and a leg-connecting portion disposed adjacent the front of the oven. As herein illustrated, the heating element is adapted to be disposed adjacent the bottom wall of the oven with its terminal end portions 17 extending through openings 20 (see FIGURE 3) formed in the oven rear wall. Thus, the element is disposed with its heat-generating portion 16 within the oven on one side of the rear wall 14 while its terminal lugs 19 are disposed on the other side of the wall for connection to suitable electrical leads (not shown).

Because of the above-disclosed normal disposition of the heating element adjacent the bottom wall of the oven, cleaning of such wall and of the adjoining portions of the side walls would be difficult were the element not shiftable from such normal position. It is for this reason that the element is pivotally secured to the oven wall 14.

Turning now to the construction by means of which the heating element is secured to the oven wall 14, only one of the two element terminal ends 17 and its associated structure will be described in detail since identical construction is employed at both ends. Referring to FIGURES 3 and 5, a flange plate 21 is secured to element terminal end 17 in spaced relation to its free end. As illustrated, plate 21 extends radially of the element and may be secured thereto by welding or the like. In the present embodiment, however, plate 21 has an integral annular collar 22 margining the opening therein through which the element extends and such collar is crimped tightly about the element to rigidly secure the latter and the flange plate together. Extending from the upper margin of the flange plate (in the position of parts shown) is a tongue 23 which projects in a direction toward the heat-generating portion of the element and away from the oven rear wall 14.

Supporting the flange plate 21 is a sheet metal bracket 24 formed of a spring material to a generally U-shape. One leg 25 thereof is adapted for disposition adjacent the oven wall 14, while another leg 26 thereof is spaced from the leg 25. As best seen in FIGURE 4, the lower portion of leg 25 is provided with a horizontal slot 27 of a size to pass the flange plate tongue 23. Spaced above slot 27 is another horizontal slot 28 for a purpose to appear. Returning to FIGURE 3, leg 26 is formed with an aperture 29 in alignment with slot 28 and is flanked by apertures 30 also aligned with the slot 28.

Interposed between the flange plate 21 and the wall 14 and between the latter and the bracket leg 25 is a backup plate 31 from which tongues 32 project in a direction away from the wall 14 and through the slot 28 in the bracket leg 25. The free ends of tongues 32 have reduced end portions 33 of a size to closely fit within respective apertures 30 in the bracket leg 26, which end portions are peened over to rivet the backup plate and the bracket together. Note that the reduced end portions of the tongues provide shoulders which abut the back side of leg 26 and thus space such leg from the backup plate. Note also that with the tongue ends peened over the bracket leg 26 as above described, the backup plate, the bracket and the flange plate and element are permanently secured together against disassembly. Therefore, there are no loose parts to be assembled when the element is to be installed in the oven.

The above disclosed bracket and its associated parts are adapted to be secured to the oven wall 14 by means of a screw 34 which passes through aperture 29 and slot 28 in the bracket and through an aperture 35 in the backup plate and is threaded into an aperture 36 formed in the oven wall 14 above the wall opening 20.

With the parts thus assembled and referring to FIGURE 5, wherein the parts are positioned with the element in its normal heating position, it will be seen that the lower end of the bracket leg 26 bears against the free end of the flange plate tongue 23 and resiliently urges the flange plate in a direction toward the wall 14 and into abutment with the backup plate 31.

If the element 15 is now pivoted from the position seen in FIGURE 5 to the position seen in FIGURE 6, the resilient engagement of the bracket leg 26 with the flange plate tongue causes sufficient resistance to pivotal movement to resiliently retain the element in the position seen in FIGURE 6 until it is intentionally returned to the position seen in FIGURE 5. It is an important feature of the present invention that the element will be yieldably retained not only in the position seen in FIGURE 6 but also in any position intermediate those seen in FIGURES 5 and 6.

It is also important that since bracket leg 26 is in constant resilient engagement with the flange plate tongue 23, an excellent ground will be provided between the heating element sheath and the oven wall 14 through the flange plate 21, the bracket 24, and screw 34. Therefore, the usual separate ground connection will be unnecessary.

Backup plate 31, in addition to the functions previously described, serves yet two other important purposes: Firstly, it serves to stiffen the oven wall 14 to prevent deflection thereof and consequent chipping of its enameled surface during pivoting of the element. Secondly, such plate provides a wear surface against which the flange plate bears thus eliminating the damage which would otherwise occur to the enameled surface of oven wall 14 were the flange plate to bear directly thereon.

While in the embodiment herein disclosed the element terminal ends 17 are widely spaced from each other so that each requires a separate pivot connection with the oven rear wall 14, it is to be understood that such ends could be closely spaced and the plate 21 provided with two openings for passing respective element terminal ends rather than the one opening herein shown. By such expedient, duplication of parts could be avoided resulting in cost savings.

In the embodiment seen in FIGURES 7, 8 and 9 wherein parts similar to those heretofore disclosed are identified with the same reference characters as before but with the suffix "a" annexed, bracket 24a is formed of somewhat heavier sheet metal than bracket 24 to provide a portion adapted to lie along the oven wall 14a. The upper margin of the bracket is formed to a channel configuration 41 to provide additional strength and for another purpose to appear.

The lower portion of bracket 24a is slit vertically to provide spaced portions 42 adapted to lie along the oven wall and an intermediate portion 43 (see especially FIGURE 9). Portion 43 is bent to incline away from the plane of the portions 42 and is slotted at 44 to pivotally receive the tongue 23a of the flange plate 21a. With the construction thus far disclosed it will be apparent that the flange plate 21a is pivotally supported by the bracket portion 43 intermediate the latter and the bracket portions 42 and that the width of the flange plate is such that it spans the space between the portions 42.

Means are provided for resiliently bearing against the free end of the flange plate tongue 23a and as herein disclosed, a spring metal plate 45 is secured to the bracket portion 41 with its lower end in engagement with the flange plate tongue to urge the latter and the flange plate in a direction toward the oven wall. Any suitable arrangement may be employed to secure the spring plate 45 to the bracket; however, at the present time, the bracket and the plate are provided with respective aligned apertures 46, 47 that pass a tubular rivet 48 which secures the bracket and the spring plate together. The assembled bracket, flange plate and spring plate may be removably secured to the oven wall 14a by means of a sheet metal screw 34a which passes through the rivet 48 and is threaded into an aperture 36a in the oven wall.

In view of the detailed disclosure of the manner of operation of the embodiment seen in FIGURES 1 through 6, it is believed that operation of the embodiment seen in FIGURE 7 through 9 will be evident. It will be pointed out, however, that the bracket portions 42 underlie the flange plate 21a and thus function in the same manner as the previously described backup plate 31.

In view of the foregoing, it will be apparent to those skilled in the art that we have accomplished at least the principal object of our invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim:

1. In combination: an apertured supporting wall, an electric heating element having a heat-generating portion disposed on one side of said wall and a terminal conductor portion extending from said one wall side through the wall aperture, a flange plate secured to and extending radially of said element for disposition on one side of said wall and having a transversely extending tongue in part providing a hinge connection between said wall and said plate and pivotally supporting the latter for movement from a first position generally parallel with said wall and at least partially covering said wall aperture and with said element disposed in its normal heating position to a second position inclined with respect to said wall and uncovering said wall aperture and with said element spaced from its normal heating position, bracket means removably secured to said wall adjacent said wall aperture and having a lower part divided into horizontally spaced portions lying along said wall, a portion intermediate said spaced portions but spaced from said wall and having an aperture for passing said flange plate tongue, and resilient means engaged with said flange plate tongue and yieldably resisting movement of said flange plate from said second position to said first position said bracket means and said resilient means being provided with aligned apertures for passing a screw which secures both of such means to said supporting wall, and a rivet extending through the aforementioned apertures to secure said bracket means and said resilient means together.

2. In combination: an apertured supporting wall, an electric heating element having a heat-generating portion disposed on one side of said wall and a terminal conductor portion extending from said one wall side through the wall aperture, a flange plate secured to and extending radially of said element for disposition on one side of said wall and having a tongue extending transversely from a marginal portion of said plate in a direction away from said wall, and means removably secured to said wall adjacent said wall aperture and having a first leg adjoining and on one side of said wall and formed with an opening for passing said flange plate tongue and cooperable with the latter to provide a hinge about which said plate is pivotable from a first position generally parallel with said wall and at least partially covering said wall aperture and with said element disposed in its normal heating position to a second position inclined with respect to said wall and uncovering said wall aperture and with said element spaced from its normal heating position, said means also having a second leg on the same side of said wall but spaced from said first leg, said second leg being resiliently engageable with the free end of said flange plate tongue for yieldably resisting movement of said flange plate from said second position to said first position.

3. The construction of claim 2 wherein said second leg biases said flange plate toward said wall, wherein a backup plate is interposed between said flange plate and said wall and between the latter and said first leg to stiffen said wall against deflection and to provide a wear surface against which said flange plate bears during its pivotal movement.

4. The construction of claim 3 wherein said backup plate is provided with a finger which passes through an aperture formed in said one member leg and which abuts said other member leg to maintain a predetermined minimum spacing between said legs.

5. The construction of claim 4 wherein said backup plate finger is affixed to said other member leg to retain said backup plate, said means and said flange plate in assembled relation.

6. The construction of claim 5 wherein screw means extend through aligned apertures in said means and said backup plate and is threaded into said wall to removably secure said parts together.

7. An assembly for mounting a sheathed electric heating element to an apertured wall of an oven in hinged fashion with a terminal end of said element extending through said wall aperture, comprising a flange plate rigidly secured to said terminal end to extend transversely thereof and adapted in one position to overlie said wall and substantially close the wall aperture, said flange plate having a tongue extending transversely therefrom in a direction away from said oven wall, a backup plate adapted to be interposed between said flange plate and said oven wall to stiffen the latter and to provide a wear surface against which said flange plate may rub, said backup plate having tongue means extending transversely therefrom in a direction away from said oven wall and formed with a reduced extremity to provide a shoulder, and a sheet-metal bracket of generally U-shaped cross-section providing a bight and spaced legs, one leg having an opening to pass said tongue means and a spaced opening to receive said flange plate tongue in hinge manner, the other leg of said bracket having an opening to pass only the reduced extremity of said tongue means so that said shoulder bears behind said other leg, the reduced extremity being headed over said other bracket leg to effect an assembly of said flange plate, said backup plate and said bracket and with said other bracket leg resiliently bearing against said flange plate tongue to yieldably restrict pivotal action of the latter, and means for securing the assembly to said oven wall.

8. An assembly for mounting a sheathed electric heating element to an apertured wall of an oven in hinged fashion with a terminal end of said element extending transversely through said wall aperture, comprising a flange plate rigidly secured to said terminal end to extend transversely thereof and adapted in one position to overlie said wall and substantially close the wall aperture, said flange plate having a tongue extending transversely therefrom in a direction away from said oven wall, a backup plate interposed between said flange plate and said oven wall to stiffen the latter and to provide a wear surface against which said flange plate may rub, said backup plate having a slot for receiving said flange plate tongue in hinge manner, a sheet metal bracket having a spring leg, means securing said flange plate, said backing plate and said bracket as a unitary assembly, with said flange plate tongue extending through said backing plate slot in hinge fashion and with said spring leg resiliently bearing against said tongue to yieldably restrict pivotal action of the latter, and means for securing the unitary assembly to said oven wall.

9. The construction of claim 8 wherein said backup plate is of sheet metal and has an upper U-shaped portion and a lower portion angularly displaced from the plane of said plate and formed with the slot for receiving the flange plate tongue, and wherein a tubular rivet maintains unitary assembly and wherein a sheet metal screw passes through said rivet and threads into an opening in said oven wall for holding said assembly to said wall.

References Cited in the file of this patent

UNITED STATES PATENTS

| 2,240,790 | Kuney | May 6, 1941 |
| 2,751,487 | Vallorani et al. | June 19, 1956 |
| 2,824,944 | Ammerman | Feb. 25, 1958 |
| 2,948,801 | Bremer | Aug. 9, 1960 |
| 3,048,688 | Drugmand | Aug. 7, 1962 |

FOREIGN PATENTS

| 728,852 | Great Britain | Apr. 27, 1955 |